(12) United States Patent
Higashio et al.

(10) Patent No.: US 8,757,036 B2
(45) Date of Patent: Jun. 24, 2014

(54) JIG FOR MEASURING DIMENSIONS OF WORKPIECE

(75) Inventors: Takafumi Higashio, Yokkaichi (JP); Hiroyuki Nakazawa, Tsu (JP); Akimasa Suda, Suzaka (JP)

(73) Assignees: Sumitomo Wiring Systems, Ltd. (JP); Suzuki Co., Ltd. (JP)

( * ) Notice: Subject to any disclaimer, the term of this patent is extended or adjusted under 35 U.S.C. 154(b) by 373 days.

(21) Appl. No.: 13/386,179

(22) PCT Filed: Jul. 31, 2009

(86) PCT No.: PCT/JP2009/063647
§ 371 (c)(1),
(2), (4) Date: Jan. 20, 2012

(87) PCT Pub. No.: WO2011/013239
PCT Pub. Date: Feb. 3, 2011

(65) Prior Publication Data
US 2012/0134573 A1     May 31, 2012

(51) Int. Cl.
| B23B 31/16 | (2006.01) |
| G01B 5/00 | (2006.01) |
| G01B 11/24 | (2006.01) |
| B23B 31/20 | (2006.01) |

(52) U.S. Cl.
CPC .............. *G01B 5/0004* (2013.01); *G01B 11/24* (2013.01)
USPC .............................................. 82/152; 82/162

(58) Field of Classification Search
CPC ............ B23B 2231/42; B23B 2231/00; B23B 2270/09; B23B 2233/16
USPC ................... 82/152, 151, 162, 164, 165, 167; 269/95; 408/103
See application file for complete search history.

(56) References Cited

U.S. PATENT DOCUMENTS

| 4,353,154 | A | * | 10/1982 | Wagner | 29/27 A |
| 4,546,573 | A | * | 10/1985 | Shiba et al. | 451/5 |
| 5,253,880 | A | * | 10/1993 | Won | 279/106 |
| 6,199,462 | B1 | * | 3/2001 | Hallett | 82/162 |
| 6,629,355 | B2 | * | 10/2003 | Murata et al. | 29/563 |
| 6,736,252 | B2 | * | 5/2004 | Shirasaki | 198/345.3 |
| 7,491,022 | B2 | | 2/2009 | Kato et al. | |
| 7,597,513 | B2 | * | 10/2009 | Chiang | 408/115 R |

FOREIGN PATENT DOCUMENTS

| JP | 61-277004 | 12/1986 |
| JP | 5-93730 | 12/1993 |
| JP | 7-12534 | 1/1995 |
| JP | 07-012534 | 1/1995 |
| JP | 9-178437 | 7/1997 |
| JP | 11-173817 | 7/1998 |
| JP | 2005-138275 | 6/2005 |
| JP | 2006-150539 | 6/2006 |
| JP | 2006150539 | 6/2006 |
| WO | 2009/093349 | 7/2009 |
| WO | 2009093349 | 7/2009 |

OTHER PUBLICATIONS

Chinese Office Action dated Dec. 23, 2013.
* cited by examiner

*Primary Examiner* — Will Fridie, Jr.
(74) *Attorney, Agent, or Firm* — Gerald E. Hespos; Michael J. Porco; Matthew T. Hespos

(57) ABSTRACT

A jig 20 that is installed on a device for measuring dimensions of a workpiece 10 based on images obtained by taking pictures of the workpiece 10 with a camera K includes a chuck mechanism 50 holding the workpiece K, a first rotation drive mechanism 80 that rotates the chuck mechanism 50 around a predetermined first rotation axis A, a first base 30 holding the first rotation drive mechanism 80, a second rotation drive mechanism 40 that rotates the first base 30 around a second rotation axis B orthogonal to the first rotation axis A, and a second base 21 holding the second rotation drive mechanism 40. The first base 30 has an opening 31A in the area around the first rotation axis A such that the workpiece 10 held by the chuck mechanism 50 is seen from the back of the first base 30 through the opening 31A.

16 Claims, 16 Drawing Sheets

JIG FOR MEASURING DIMENSIONS OF WORKPIECE

BACKGROUND OF THE INVENTION

1. Field of the Invention

The present invention relates to a jig that is installed on a measuring device for measuring dimensions of a workpiece.

2. Description of the Related Art

Conventionally, a method of measuring dimensions of a manufactured workpiece using images obtained by taking pictures of the workpiece with a camera is known. (See Japanese Unexamined Patent Application Publication No. 11-173817, for example.)

In the method, depending on the kind of a workpiece, measurement of various dimensions of each of six surfaces, that is, a front surface, a back surface, a top surface, a bottom surface, a right side surface, and a left side surface of a terminal fitting to be fixed to the end of an electric wire, for example, is required in some cases. In the case of measurement of a terminal fitting, a jig in which the terminal fitting can be inserted and attached in a state where each of the above six surfaces points at the optical axis of a camera is used.

In the above method, however, there is a problem that each time a picture of each of the six surfaces is taken, the terminal fitting must be reinstalled on the jig by changing the orientation of the terminal fitting, which requires labor and time for measurement work.

The present invention has been completed in view of the above circumstances, and its object is to provide a jig that enables an efficient measurement of dimensions of a workpiece.

SUMMARY OF THE INVENTION

The present invention is a jig that is installed on a device for measuring dimensions of a workpiece based on images obtained by taking pictures of the workpiece with a camera and which includes a chuck mechanism holding a workpiece, a first rotation drive mechanism that rotates the chuck mechanism around a predetermined first rotation axis, a first base that holds the first rotation drive mechanism, a second rotation drive mechanism that rotates the first base around a second rotation axis orthogonal to the first rotation axis, and a second base that holds the second rotation drive mechanism.

An example of use of this jig is as described below. A workpiece is held with respect to the chuck mechanism with its axis line being positioned along the first rotation axis. When the jig is installed in a configuration that the first rotation axis in relation to the above chuck mechanism is positioned in an orientation along the optical axis of a camera, a picture of the workpiece is taken from the direction ahead of the axis line, that is, a picture of the front surface is taken. When the first base is turned 90 degrees around the second rotation axis to position the first rotation axis orthogonal to the optical axis of the camera, the workpiece is also positioned with its axis line being orthogonal to the optical axis of the camera. From this state, by rotating the chuck mechanism by 90 degrees around the first rotation axis, pictures of the top surface, bottom surface, right side surface, and left side surface of the workpiece are taken.

That is, once a workpiece is held by the chuck mechanism, the first base and the chuck mechanism are rotated around the rotation axis by the rotation drive mechanism. As a result, pictures of at least five surfaces of the workpiece can be taken, that is, dimensions of them can be measured.

The first base may have an opening in the area around the first rotation axis such that the workpiece held by the chuck mechanism is seen from the back of the first base through the opening. In the jig, when the first rotation axis in relation to the chuck mechanism is positioned in the orientation along the optical axis of the camera and the first base is turned 180 degrees around the second rotation axis from the state where the workpiece is opposed to the camera, the first base is inverted to position the workpiece with its back being pointed at the camera, and a picture of the back surface of the workpiece is taken through the opening on the first base. Pictures of six surfaces, including the back surface, of the workpiece can be taken, that is, the dimensions can be measured.

The chuck mechanism may have a clamping part that positions and resiliently clamps the mounted part connected to the workpiece. The workpiece is resiliently clamped with its mounted part positioned by the clamping part, thereby being held in a certain position with respect to the chuck mechanism.

The first rotation mechanism may includes a first motor, a rotating body that is rotatable around the first rotation axis by the first motor, and a mounting part provided on the rotating body in order to mount the chuck mechanism. The first motor is rotated, thereby rotating the chuck mechanism mounted on the rotating body around the first rotation axis.

The chuck mechanism may have reference parts whose pictures can be taken with the camera and which are used as a reference to determine whether or not the chuck mechanism is appropriately positioned with respect to the camera. Based on the obtained images of the reference parts, whether or not the chuck mechanism is set in a normal position with respect to the camera is determined.

The second rotation mechanism may have a shaft provided on the first base, a shaft bearing part provided on the second base and supporting the shaft, a second motor, and a connection mechanism that drives and connects an output shaft of the second motor and the shaft of the first base. When the second motor is rotated, the first base is rotated about the second rotation axis via the connection mechanism.

The workpiece preferably is a terminal fitting, and preferably is held by the chuck mechanism in a state of being connected to the carrier. The chuck mechanism has a pair of clamping surfaces with which the carrier of the terminal fitting are held in a configuration of being openable and closable and biased in the closing direction by the spring elastic force. After the pair of clamping surfaces is opened against the spring elastic force, the carrier is inserted and then the opening force is removed. As a result, both of the clamping surfaces resiliently clamp the carrier, thereby holding the terminal fitting to the chuck mechanism.

One of the clamping surfaces may have a positioning hole that is concentrically aligned with a pilot hole formed on the carrier connected to the terminal fitting. The carrier of the terminal fitting is clamped between the pair of clamping surfaces by the spring elastic force. Then, in the process of passing a rod-like jig, for example, through the positioning hole of one of the clamping surfaces and the pilot hole of the carrier to bring both holes in alignment, the carrier, that is, the terminal fitting is positioned while the carrier is moved between the two clamping surfaces.

By using the jig of the present invention, dimensions of a workpiece can be efficiently measured.

DETAILED DESCRIPTION OF THE PREFERRED EMBODIMENTS

One embodiment of the present invention will be described with reference to FIGS. 1 to 16. In this embodiment, a measuring device that measures dimensions of a terminal fitting to be fixed to an end of an electric wire is described as an example.

Figure 3:
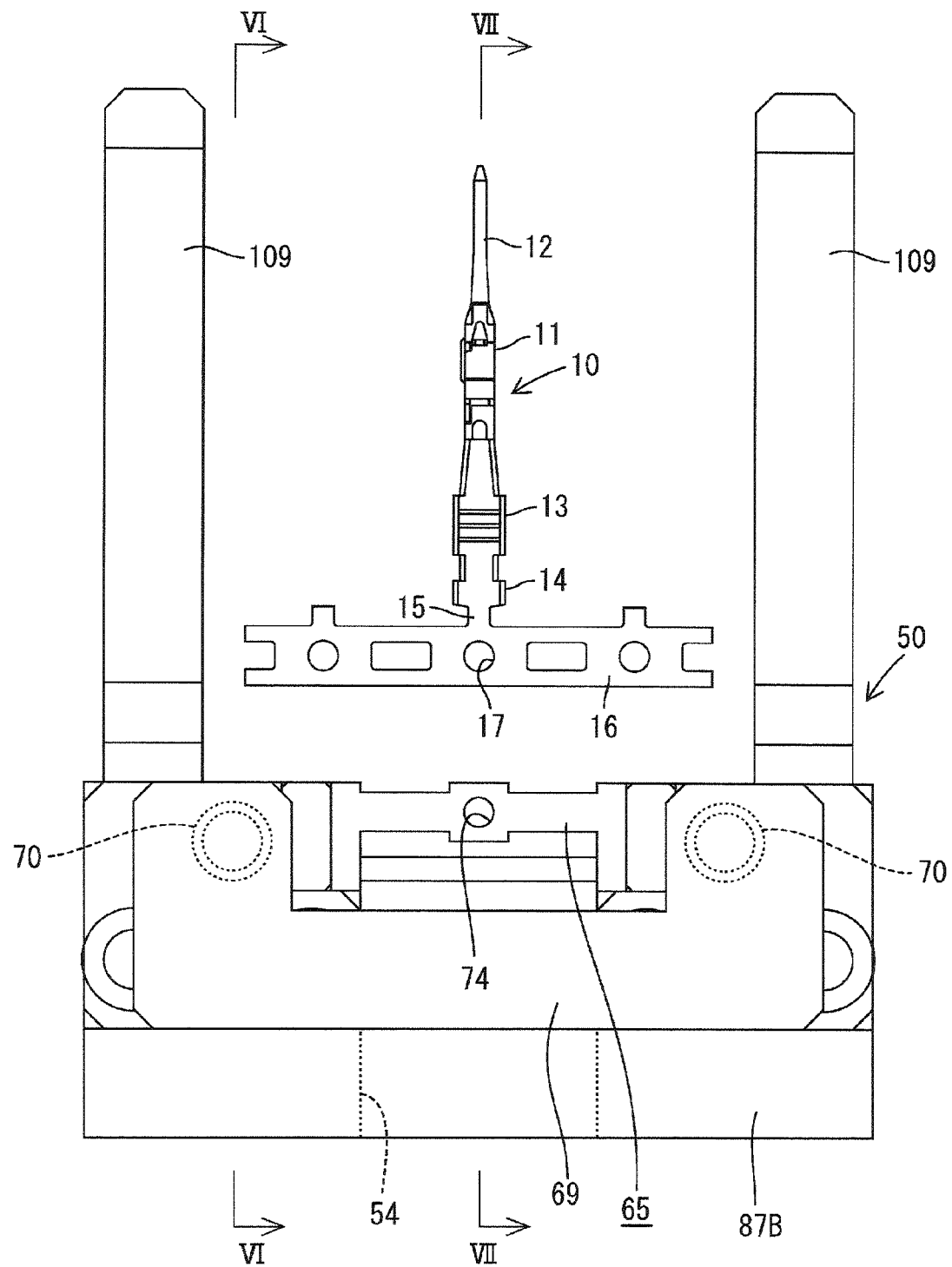
FIG. 3 is a front view showing the state before the male terminal is held by the chuck mechanism.

In this embodiment, a male terminal 10 is used as an example of a workpiece. The male terminal 10 is, as shown in FIG. 3, provided on one side edge of a strip-like carrier 16 as chain terminals formed with equal pitches. The male terminal 10 has a tab 12 projected on the front surface of a square tubular body 11, and also has a wire barrel 13 and an insulation barrel 14 in the rear of the body 11. A connecting portion 15 at the back of the insulation barrel 14 is connected to one side edge of the carrier 16.

For the male terminal 10 as a workpiece to be measured, as shown in the same figure, male terminals on both sides are cut off, but the continuous area for three pieces on the carrier 16 remains. The remaining carrier 16 is a mounted part of the present invention. The carrier 16 has pilot holes 17 that are round holes and used for transfer in the manufacturing process, at the positions corresponding to each male terminal 10.

Figure 1:
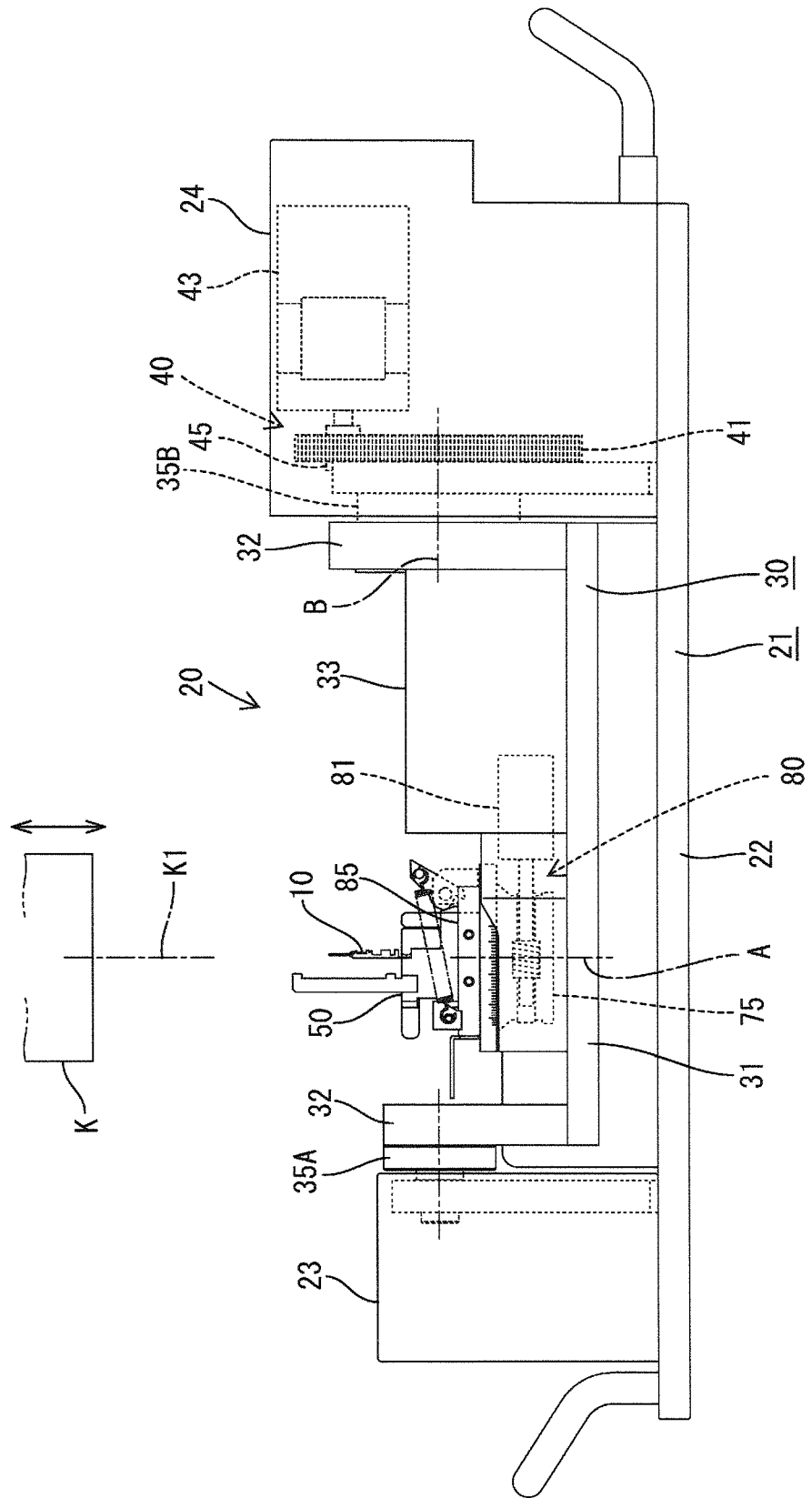
FIG. 1 is a side view according to one embodiment of the present invention.

The measuring device, as shown in FIG. 1, is set over the jig 20 holding the above male terminal 10 with the optical axis K1 of a camera K pointing at the vertically downward direction. The pictures of the male terminal 10 taken with the camera K are processed with a computer, etc. and the dimensions of any given points on the same pictures can be measured.

Figure 2:
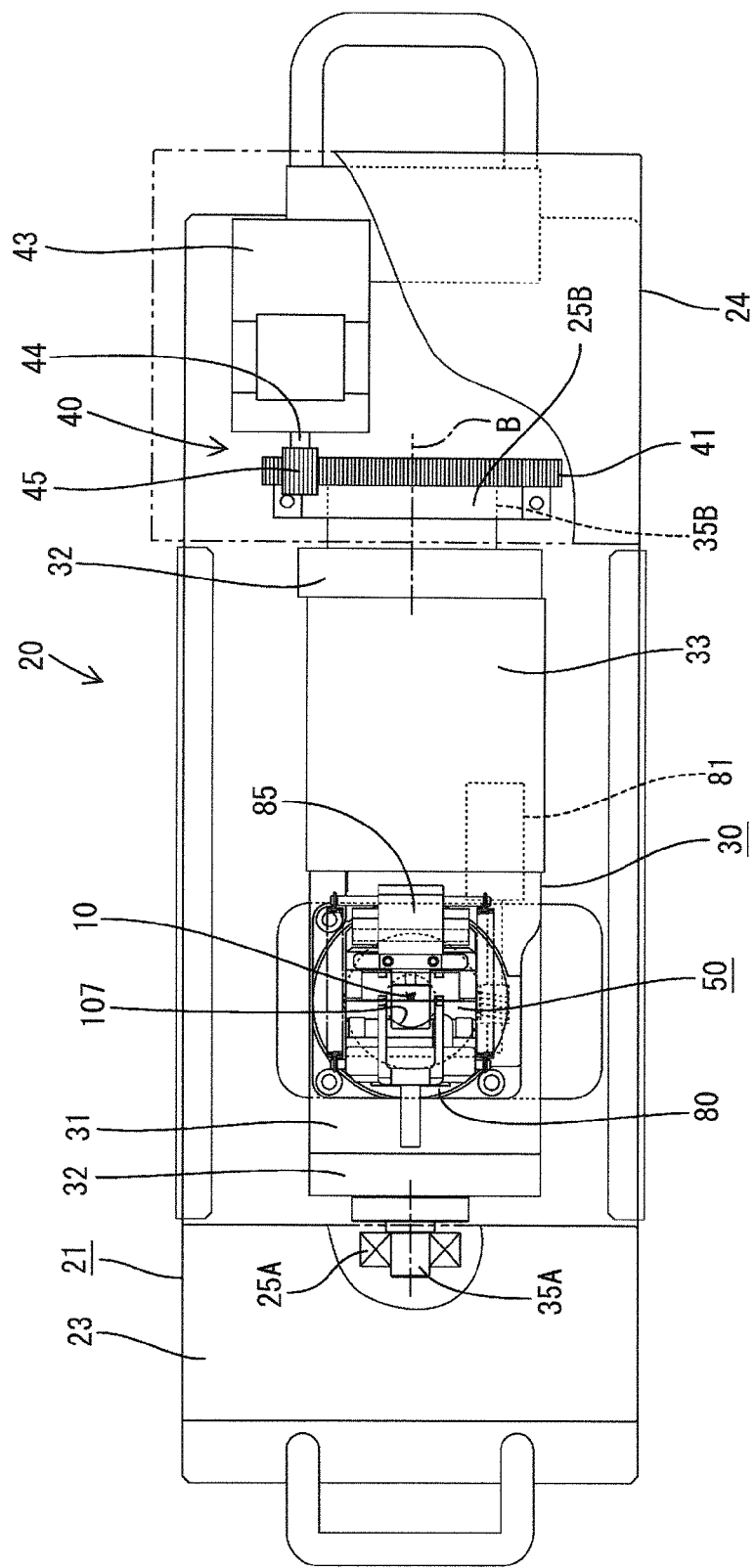
FIG. 2 is a partially cutaway plan view of FIG. 1.

Next, the structure of the jig 20 is described. Generally, as shown in FIGS. 1 and 2, the jig 20 is supported with respect to the jig body 21 (corresponding to the second base of the present invention) such that the movable base 30 (corresponding to the first base of the present invention) can rotate about the second rotation axis B that is a horizontal axis, and the chuck mechanism 50 holding the male terminal 10 that is a workpiece is supported with respect to the movable base 30 so as to be rotatable about the first rotation axis A orthogonal to the above second rotation axis B.

The jig body 21 has box-shaped machine rooms 23, 24 opposed to each other on both ends of a plane rectangular base plate 22. The jig body 21 is placed in a horizontal position on the workbench, which is not shown, and is adjustably movable in the X-Y direction orthogonal to each other on the horizontal plane.

The movable base 30 is configured with the side boards 32 standing up from both ends of the plane rectangular bottom plate 31 that has a length equal to the distance between the two machine rooms 23, 24 of the above described jig body 21 and a width about half of the width of the base plate 22 of the jig body 21. On one side of the bottom plate 31 of the movable base 30 (the right side in FIG. 1), a machine room 33 is provided while on the other side is a space for disposition of a chuck mechanism 50.

The movable base 30 is disposed between the two machine rooms 23, 24 with the bottom plate 31 floating up by a predetermined distance from the base plate 22, and the shaft parts 35A, 35B projected from both side boards 32 in the directions opposite to each other on the same axis line are connected with the shaft bearing parts 25A, 25B of the opposed machine rooms 23, 24 and are supported so as to be rotatable about the horizontal second rotation axis B as described above.

For the drive mechanism 40 of the movable base 30 (corresponding to the second rotation drive mechanism of the present invention), the above described right shaft bearing part 25B is a cross roller bearing, which has the right shaft part 35B of the movable base 30 engaged with the inner ring supported in the outer ring so as to be rotatable and the gear 41 concentrically attached to the outer surface of the inner ring. In the machine room 24, the second stepping motor 43 (hereinafter, the second S motor 43) is placed in a horizontal position and facing leftward with the pinion 45 provided at the end of the output shaft 44 thereof being engaged with the above gear 41.

When the second S motor 43 is driven, the movable base 30 is rotated about the second rotation axis B by a given angle in both normal and reverse directions.

Figure 4:
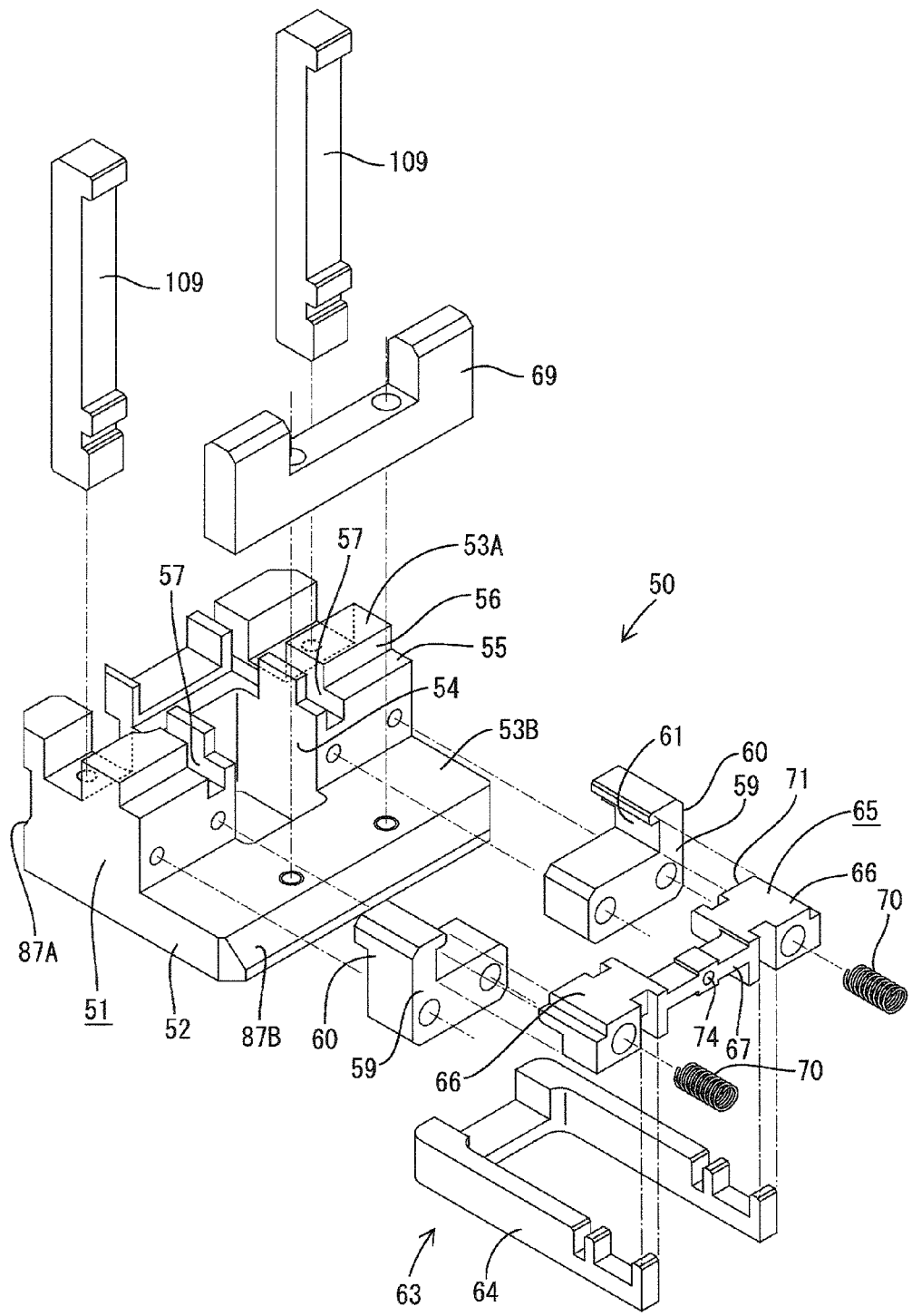
FIG. 4 is an exploded perspective view of the chuck mechanism.
Figure 5:
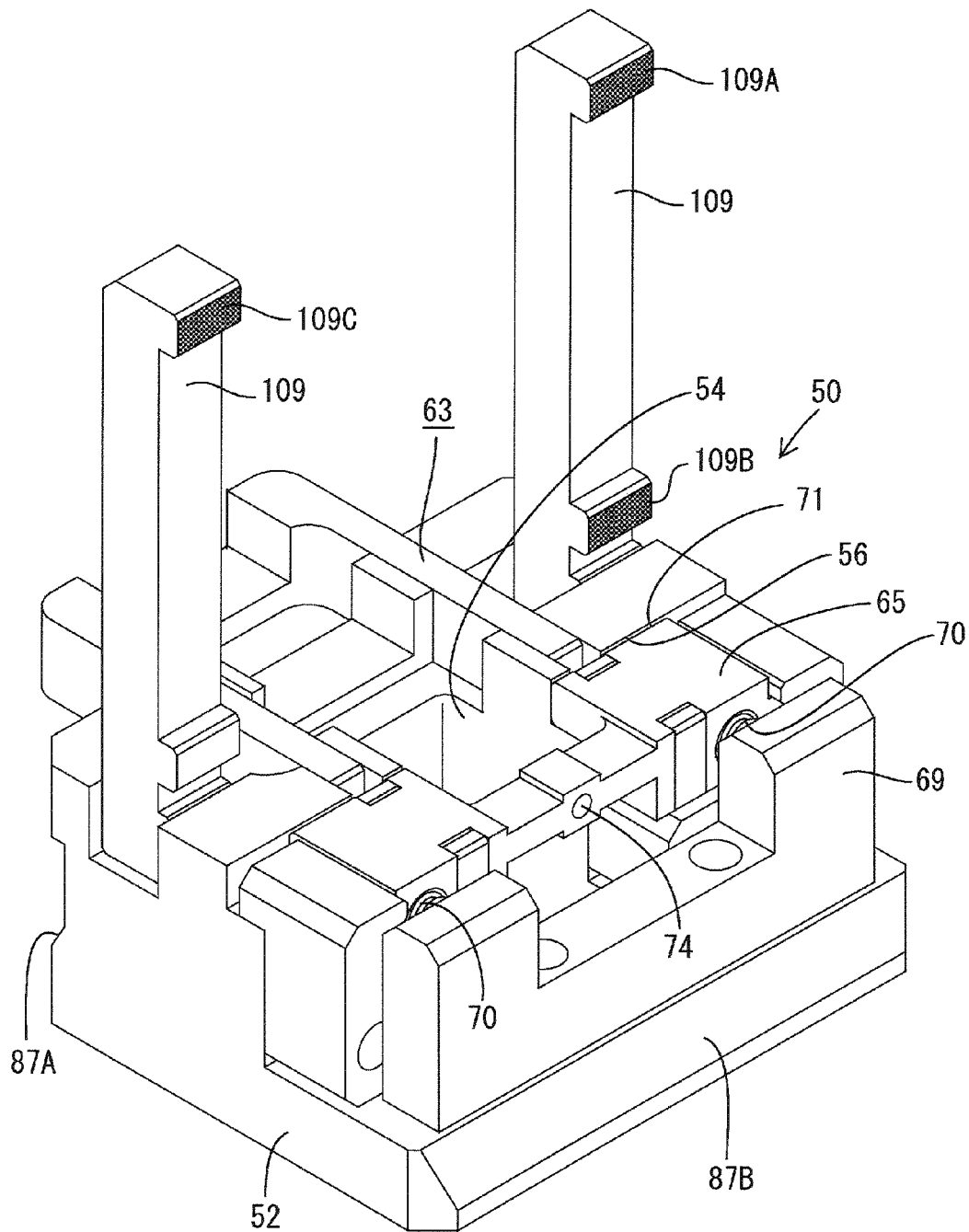
FIG. 5 is a perspective view of the same.

Next, the chuck mechanism 50 is described. The chuck mechanism 50 includes the body part 51 having a high-level part 53A on one side of the square base 52 as shown in FIGS. 4 and 5. In the center of the body part 51, there is a square through-hole 54, vertically passing through the body part, which is mostly located over the high-level part 53A and partially extends off to the low-level part 53B. The upper end corner of the side facing the low-level part 53B in the high-level part 53A is cut off at the right angle, and the horizontal bottom surface forms a receiving surface 55 against which the outer edge of the carrier 16 of the male terminal 10 as a workpiece is applied and received, and the longitudinal surface of the back forms a first clamping surface 56 that clamps the carrier 16 in the plate thickness direction.

On both sides of the through-hole 54 in the high-level part 53A of the body part 11, a pair of guide grooves 57 parallel to each other is cut off. Also, on the forward side in the high-level part 53A, a pair of guide bodies 59 is mounted on both sides of the through-hole 54. Each of the guide body 59 has a height flush with the groove bottom of the above described guide groove 57 and a hook-shaped side wall 60 standing at the outer end to form another guide groove 61.

On the other hand, a movable clamping body 63 is provided. The movable clamping body 63 is configured to have a clamping part 65 fitted so as to bridge between both open ends of the plane gate-shaped frame body 64. The clamping part 65 further includes thick-walled sliding portions 66 disposed on both ends and a thin-walled connecting portion 67 connecting the upper parts of the forward sides of the opposed surfaces of both sliding portions 66.

The movable clamping body 63 is attached movably in the front-back direction by sliding the sliding portion 66 from the top surface of the guide body 59 over the receiving surface 55 with the right and left frame arms of the frame body 64 being fitted in the guide grooves 57 and with the right and left outer edges of both sliding portions 66 being fitted in the guide grooves 61 of the guide bodies 59.

Figure 6:
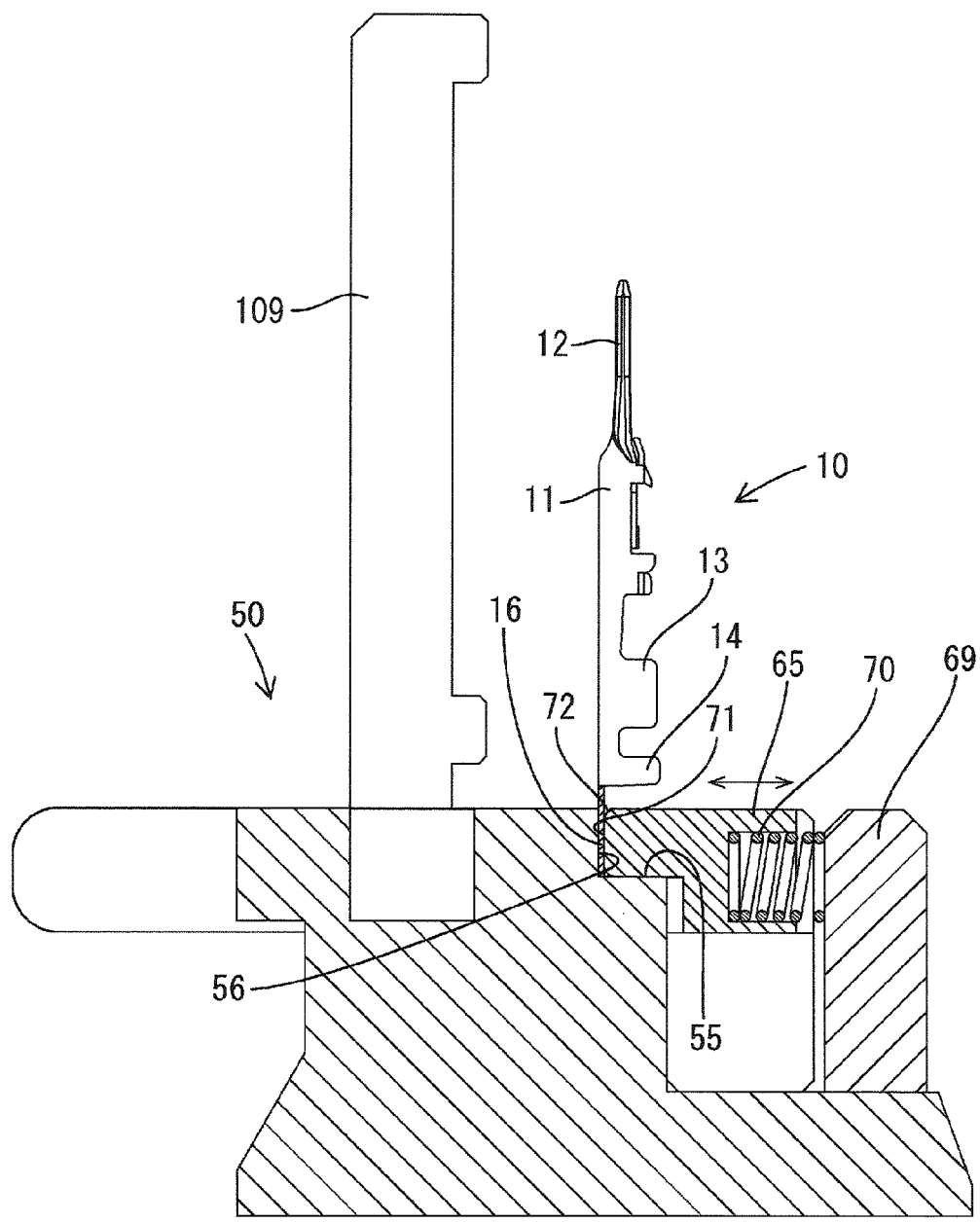
FIG. 6 is a cross-sectional view taken from line VI-VI of FIG. 3 and showing the state of the male terminal inserted in the chuck mechanism.

The movable clamping body 63 is slid and biased forward by the elastic expanding force of the compression coil spring 70 interposed between the back surfaces of both sliding portions 66 and the spring receiver 69 provided at the rear end of the top surface of the base plate 22. The front surfaces of the sliding portions 66 are resiliently pressed against the opposed first clamping surfaces 56, in other words, resiliently clamp the carrier 16 of the male terminal 10 with the first clamping surface 56, as shown in FIG. 6. As a result, the front surfaces of both sliding portions 66 become the second clamping surfaces 71, and on the upper edge of each of the second clamping surfaces 71, a guide surface 72 formed of a C surface is provided for induction of the carrier 16.

In addition, in the central position in the width direction of the connecting portion 67 of the clamping part 65 in the movable clamping body 63, a positioning hole 74 penetrated in the front-back direction is provided. The positioning hole 74 is a round hole in alignment with the pilot hole 17 provided on the carrier 16 of the male terminal 10 and is located at the same height as the pilot hole 17 when the carrier 16 is applied against the receiving surface 55.

Figure 7:
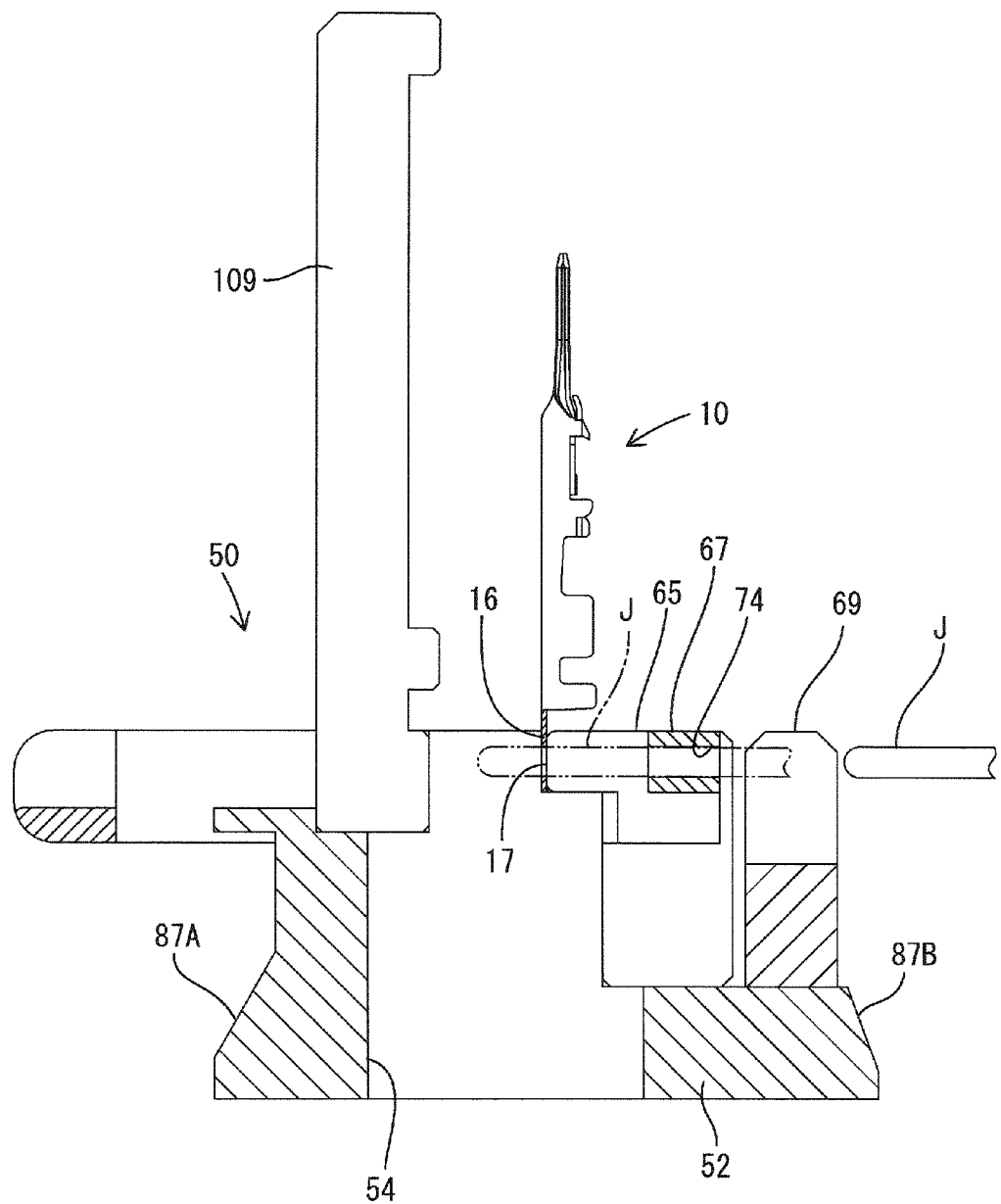
FIG. 7 is a cross-sectional view taken from line VII-VII of FIG. 3 and showing the operation of positioning the male terminal.
Figure 8:
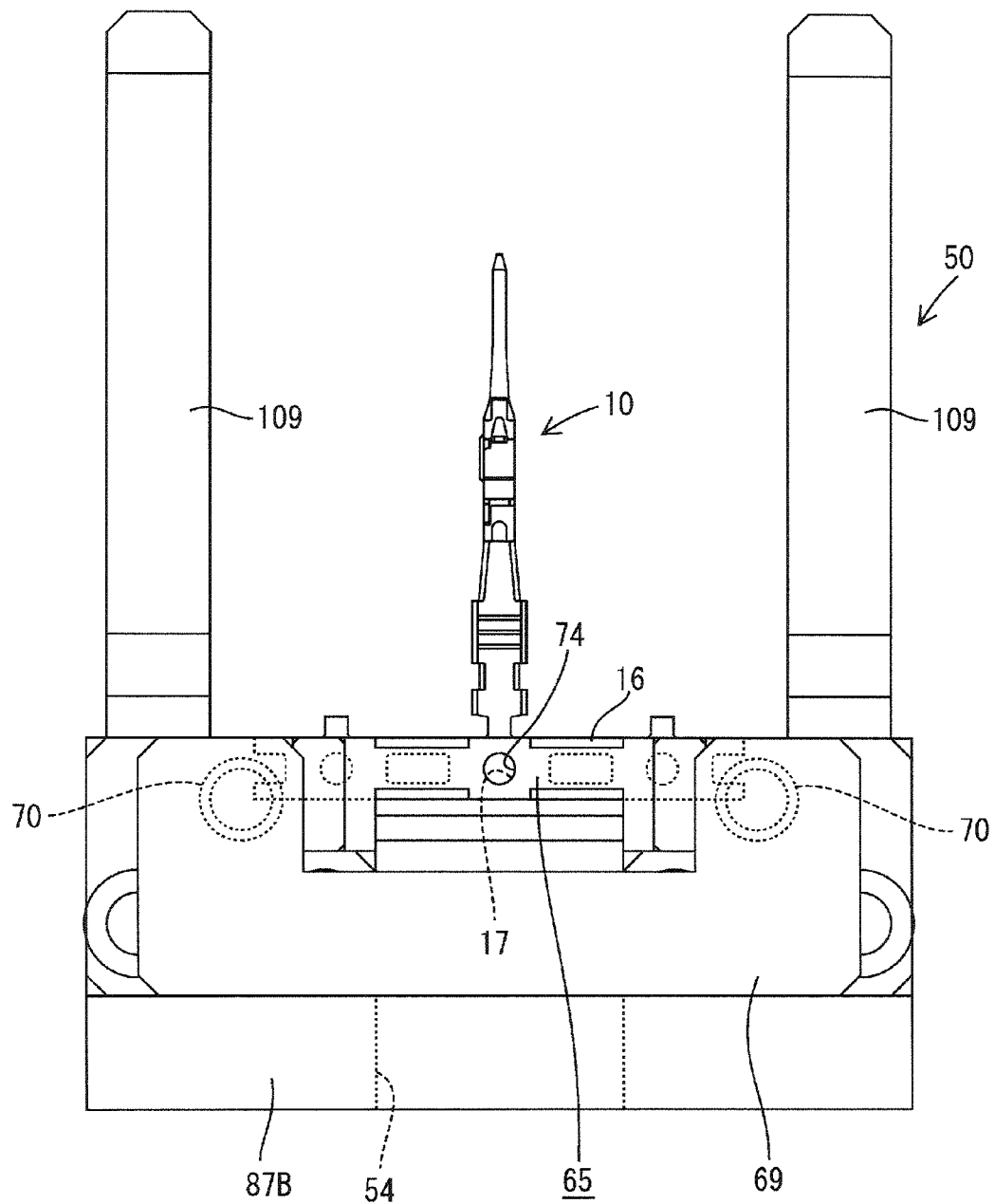
FIG. 8 is a front view showing the state of the male terminal normally held by the chuck mechanism.
Figure 9:
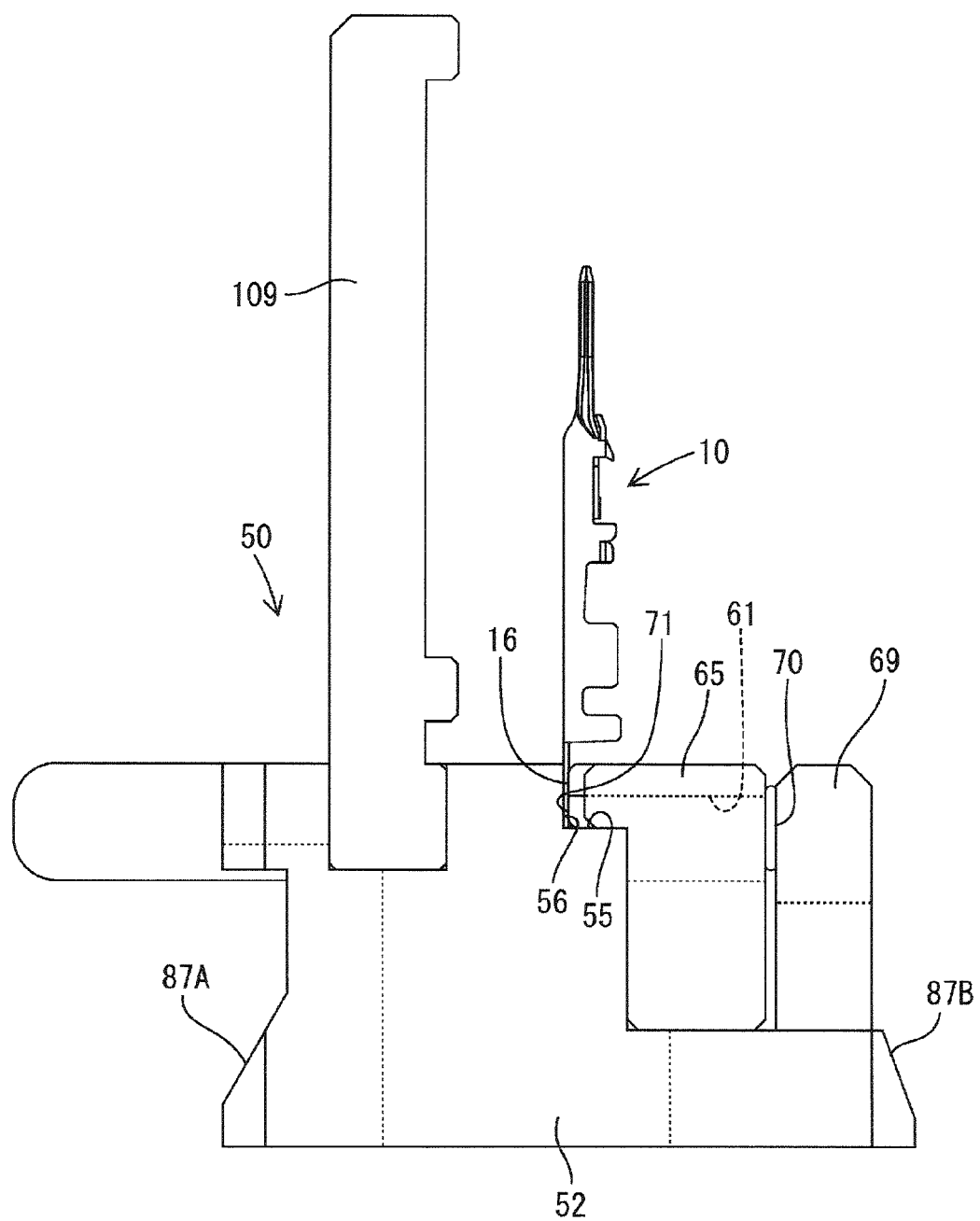
FIG. 9 is a side view of the same.
Figure 10:
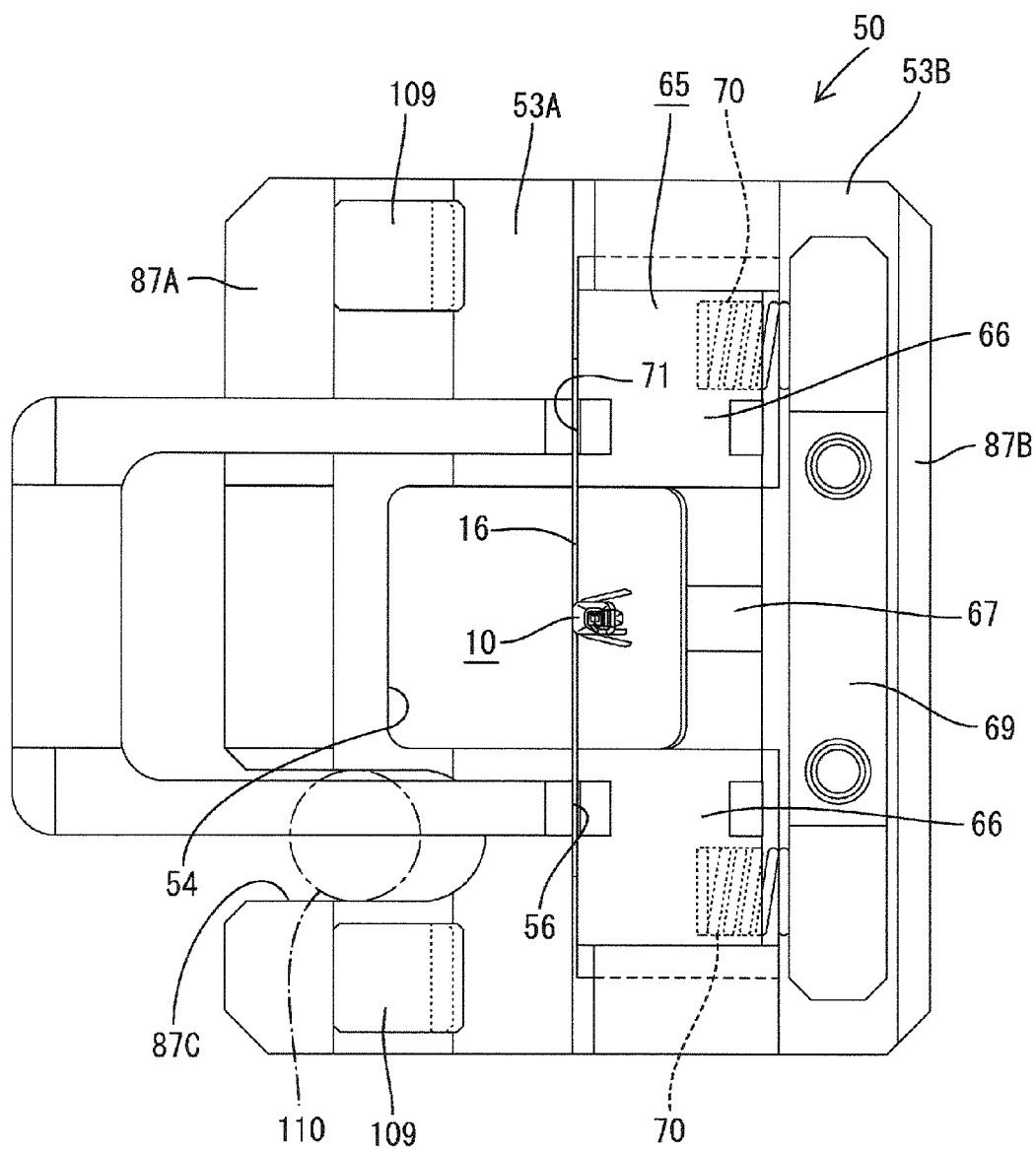
FIG. 10 is a plan view of the same.

To hold the male terminal 10 to the chuck mechanism 50, the carrier 16 of the male terminal 10 is positioned roughly in the right-left direction as shown in FIG. 3. After that, while the movable clamping body 63 is moved backward against the elastic force of the compression coil spring 70, the carrier is inserted between both clamping surfaces 56, 71 till it comes into contact with the receiving surface 55 throughout its length (FIG. 6). After that, as shown in FIG. 7, when a positioning jig J that is a round pin is inserted into the positioning hole 74, it reaches the pilot hole 17 of the carrier 16. At that time, if the positioning hole 74 and the pilot hole 17 are not aligned, the carrier 16 is moved in the right-left direction to insert the jig 20 into pilot hole 17. After that, when the jig 20 is pulled out, as shown in FIGS. 8 to 10, the carrier 16 is positioned in the right-left direction to be resiliently clamped between both clamping surfaces 56, 71, and the male terminal 10 is held from above in the substantially central part of the through-hole 54 with its axis line being projected in a position orthogonal to the base 52.

Figure 12:
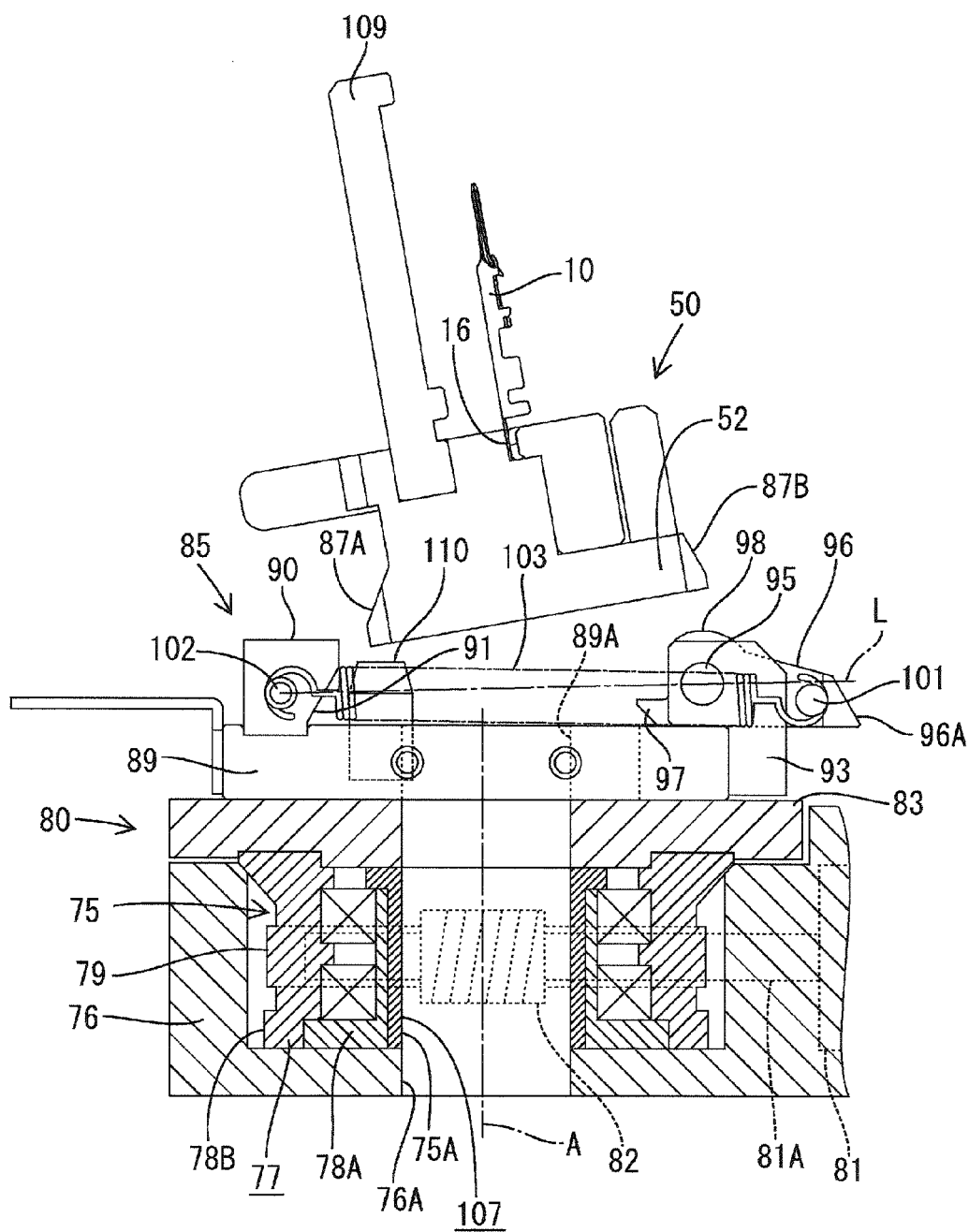
FIG. 12 is a partially cutaway side view showing the operation of mounting the chuck mechanism to the rotating body.

In the space for disposition of the chuck mechanism 50 on the bottom plate 31 of the movable base 30, there is an opening 31A, on which a rotating body 75 is mounted. The rotating body 75 is accommodated in the case 76 for unitization as shown in FIG. 12. The bottom surface of the case 76 has a round through-hole 76A. A cross roller 77 is placed on the through-hole 76A. The inner ring 78A is fixed to the case 76, while a helical gear 79 is cut on the outer periphery of the outer ring 78B. The axis line of the cross roller 77 is the above described first rotation axis A. In the right front position of the cross roller 77 in the case 76, the first stepping motor 81 (hereinafter, the first S motor 81) is placed in the horizontal position facing leftward with a worm 82 provided at the tip of the output shaft 81A being engaged with the above helical gear 79. Also, on the outer ring 78B of the cross roller 77, an annular rotating plate 83 is fixed.

When the first S motor 81 is driven, the rotating plate 83 is rotated, via engagement of the worm 82 and the helical gear 79, around the first rotation axis A in both normal and reverse directions by a given angle. Thus, the drive mechanism 80 of the chuck mechanism 50 (corresponding to the first rotation drive mechanism of the present invention) is configured.

On the rotating plate 83 in the rotating body 75, a mounting part 85 for mounting the above chuck mechanism 50 so as to be removable is provided.

Therefore, as shown in FIG. 9, on both right and left edges of the base 52 in the chuck mechanism 50, the pressed portions 87A, 87B are hung out throughout the width. The pressed portions 87A, 87B are tapered with the overhang gradually increasing toward the downward direction, and the left pressed portion 87A is slightly higher.

Figure 11:
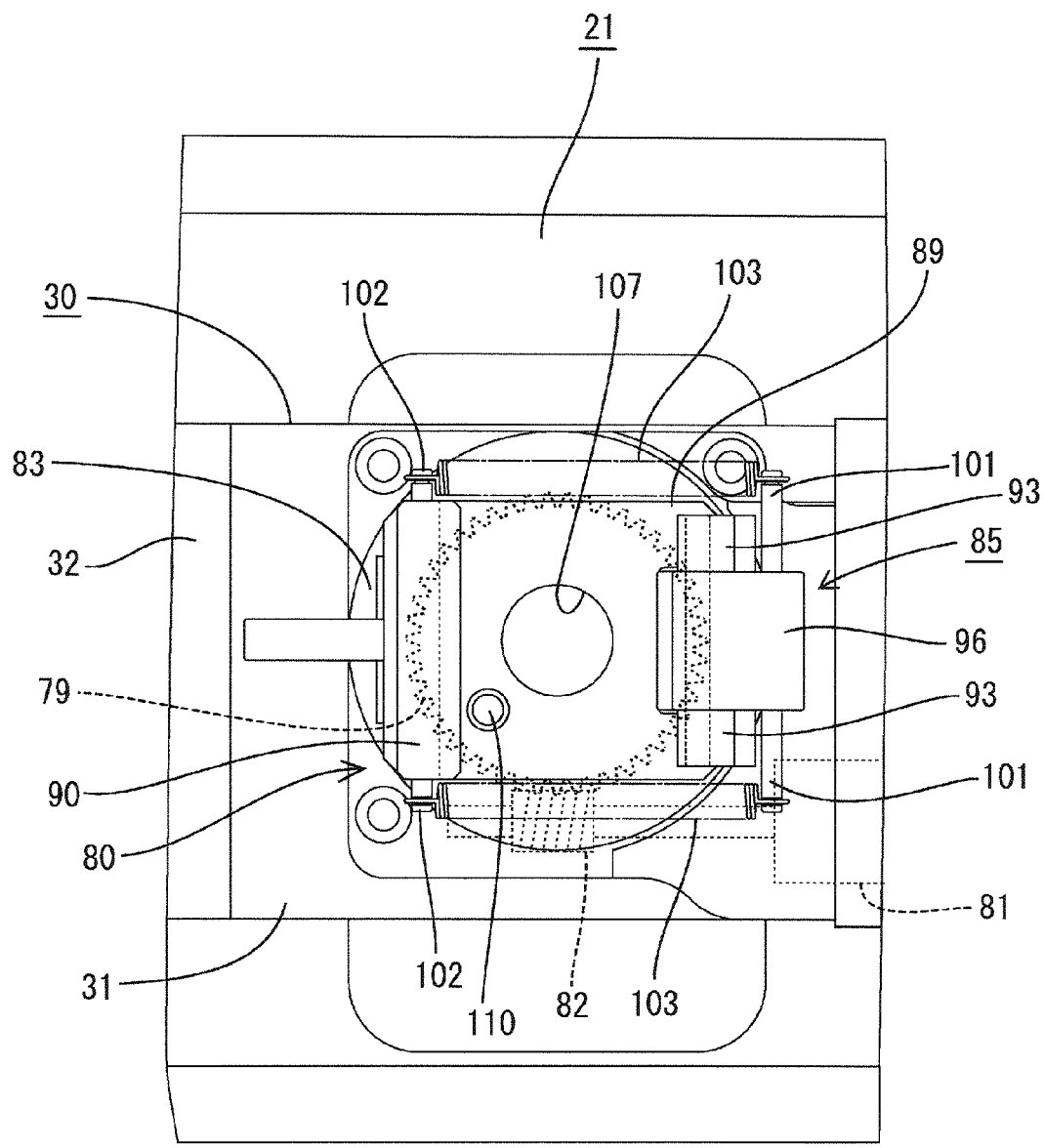
FIG. 11 is a plan view of the first rotation drive mechanism.

In the mounting part 85, as shown in FIG. 11, a square mounting plate 89 having a central hole 89A is fixed on the rotating plate 83. On the left side edge of the mounting plate 89 in FIG. 12, a fixed pressing body 90 is provided throughout the length. The fixed pressing body 90 has a pressing surface 91 cut off at the lower part of the inside, under which the left pressed portion 87A provided on the base 52 of the above chuck mechanism 50 is held down.

On the other hand, a pair of supporting columns 93 stand at the outside of the front and rear ends of the right edge of the mounting plate 89. Each of the supporting columns 93 has an upper end bent into a key-shape so as to come over the right edge of the mounting plate 89. A wide swing pressing body 96 is fitted between the supporting columns 93, which is swingably supported by the shaft 95 disposed on the upper end of the supporting column 93.

The swing pressing body 96 is shaped in cross section so as to have a smaller projection at one side (inside) of the shaft supporting portion and a larger projection at the other side (outside). The projection toward the inside has, on its peripheral surface, an engaging projection 97 engaged with the right pressed portion 87B of the base 52 of the chuck mechanism 50 and a pressing part 98, against which the right pressed portion 87B is pressed, formed at an angle distance of substantially 90 degrees, as described later. When the swing pressing body 96 swings about the shaft 95 in the clockwise direction in FIG. 12, it reaches the right side edge of the mounting plate 89 and is kept in a substantially horizontal position without being swung further.

In this position, the swing pressing body 96 is open. In this open position, the engaging projection 97 projects to the left side of the bent upper end of the supporting column 93, while the pressing part 98 is freed upward.

The swing pressing body 96 has an elongated latch pin 101 projected at both ends of the outer projecting end (releasing part 96A), and the above fixed pressing body 90 has a short latch pin 102 projected at both ends. Extension coil springs 103 are attached individually between both latch pins 101, 102.

When the swing pressing body 96 is in an open position, the latch pin 101 of the swing pressing body 96 is positioned under the extension L connecting between the latch pin 102 of the fixed pressing body 90 and the swing shaft 95 of the swing pressing body 96.

Therefore, when the swing pressing body 96 is in an open position, a swinging force in the clockwise direction in FIG. 12 is applied to the swing pressing body 96 by the resilient contractive force of the extension coil spring 103, and it is pressed to the right side edge of the mounting plate 89 and securely held in the open position. When the swing pressing body 96 is swung from the open position to the counter-clockwise direction till the latch pin 101 of the swing pressing body 96 reaches the extension L connecting between the latch pin 102 of the fixed pressing body 90 and the swing shaft 95 of the swing pressing body 96, that is, till it exceeds the dead point, then a swinging force in the counter-clockwise direction is applied to the swing pressing body 96 by the resilient contractive force of the extension coil spring 103. Thus, a toggle mechanism is configured. The mounting plate 89 has, on its right side edge, a relief concave 105 for freeing the engaging projection 97 when the swing pressing body 96 is swung in the counter-clockwise direction as described above.

The left pressed portion 87A of the base 52 in the chuck mechanism 50 has a U-shaped positioning groove 87C cut in a position closer to the frontward end, as shown in FIG. 10. On the other hand, as shown in FIGS. 11 and 12, a positioning pin 110 is to be closely fitted in the above positioning groove 87C stands at a position that is on the right of the fixed pressing body 90 and is closer to the frontward end on the mounting plate 89.

In order to mount the chuck mechanism 50 on the rotating body 75, as shown in FIG. 12, the chuck mechanism 50 is tilted with the swing pressing body 96 being kept in an open position. While the positioning pin 110 is being inserted into the positioning groove 87C, the left pressed portion 87A of the base 52 is slipped under the pressing surface 91 of the left fixed pressing body 90, and around that point, the base 52 is turned in the horizontal position. Then, the underside of the right pressed portion 87B presses the engaging projection 97 projecting from the end of the inside of the swing pressing body 96, and the swing pressing body 96 swings in the counter-clockwise direction against the biasing force of the extension coil spring 103. When the swing pressing body 96 swings in excess of the dead point as described above, it swings in the counter-clockwise direction by the biasing force of the extension coil spring 103. When the base 52 is leveled and placed on the mounting plate 89, the pressing part 98 of the swing pressing body 96 resiliently presses the tapered surface of the right pressed portion 87B, presses the left pressed portion 87A toward the lower position of the pressing surface 91, and presses the right pressed portion 87B against the mounting plate 89. As a result, the chuck mechanism 50 is positioned in two directions, that is, in the front-back and right-left directions and held with respect to the mounting part 85.

When the chuck mechanism 50 is normally mounted to the mounting part 85 of the rotating body 75, the through-hole 54 of the chuck mechanism 50, the central hole 89A of the mounting plate 89, the central hole 75A of the rotating body 75 and the through-hole 76A of the bottom surface of the case 76 are all aligned substantially concentrically to form a through bore 107 passing through in the vertical direction. In addition, when the first S motor 81 is driven, the chuck mechanism is rotated by a given angle in both normal and reverse directions around the first rotation axis A orthogonal to the second rotation axis B described above which is also the central shaft of the helical gear 79.

A pair of reference poles 109 stands on the high-level part 53A in the chuck mechanism 50, and they are used to determine whether or not the chuck mechanism 50 is set in a normal position with respect to the camera K. As shown in FIG. 5, one reference pole 109 has a first focus surface 109A and a second focus surface 109B at the distal end and the proximal end, respectively, and the other reference pole 109 has a third focus surface 109C at the distal end.

This embodiment is configured as described above. An example of use is described below.

First, the male terminal 10 that is a workpiece is held by the chuck mechanism 50 in the previously described procedure. Briefly repeating, as shown in FIG. 6, the carrier 16 of the male terminal 10 is inserted between both clamping surfaces 56, 71 from the guide surface 72 against the elastic force of the compression coil spring 70 till it comes into contact with the receiving surface 55. After that, as shown in FIG. 7, using the jig J, the carrier 16, that is, the male terminal 10 is positioned in the right-left direction. As a result, the male terminal 10 is held from above in the central part of the through-hole 54 with its axis line being projected in a position orthogonal to the base 52.

Figure 13:
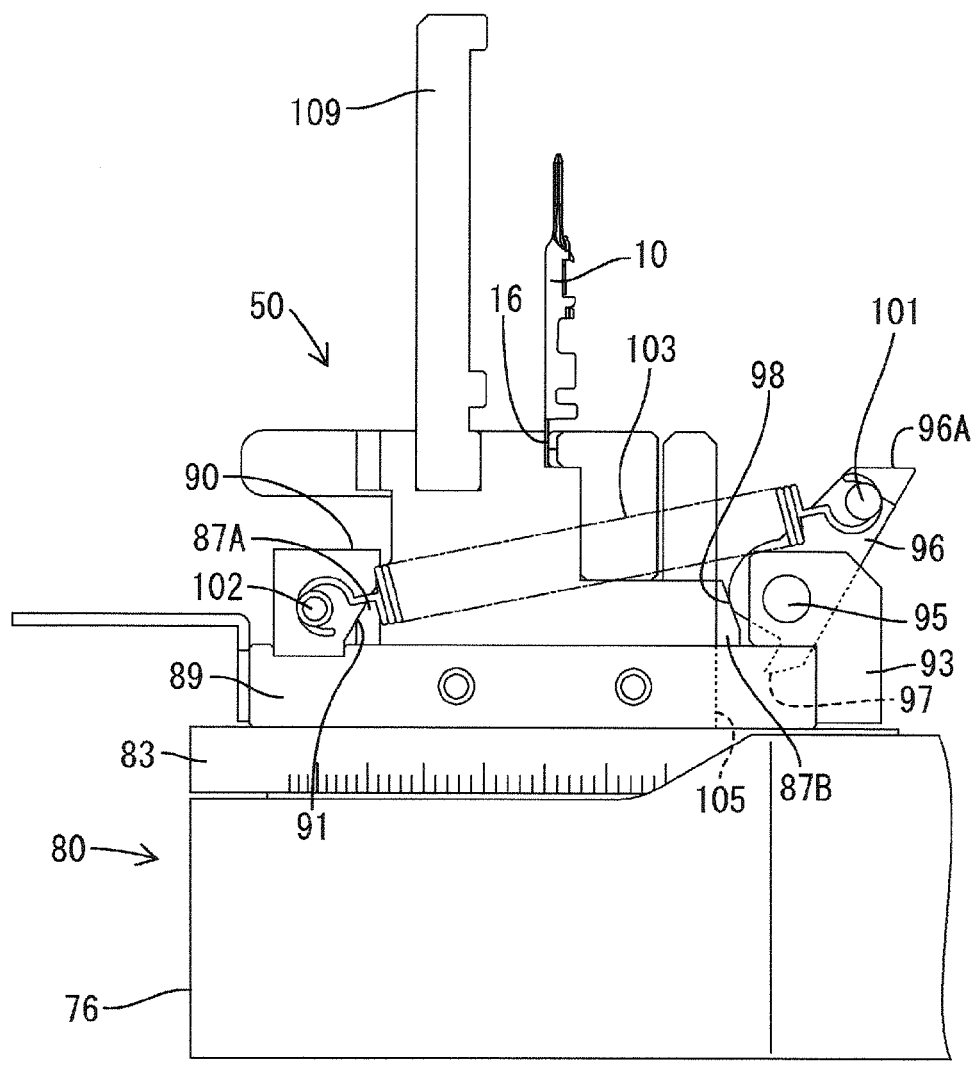
FIG. 13 is a side view at the completion of mounting.

The chuck mechanism 50 holding the male terminal 10 will be mounted on the mounting part 85 of the rotating body 75 disposed on the movable base 30. To do so, as shown in FIG. 12, while the positioning pin 110 is being inserted into the positioning groove 87C, the left pressed portion 87A of the base 52 in the chuck mechanism 50 is slipped under the pressing surface 91 of the fixed pressing body 90. After that, the engaging projection 97 of the swing pressing body 96 is pushed by the right pressed portion 87B and swung in the counter-clockwise direction. As a result, as shown in FIG. 13, the pressing part 98 of the swing pressing body 96 resiliently presses the right pressed portion 87B due to the toggle mechanism, and the chuck mechanism 50 is held with respect to the mounting part 85 in a predetermined position.

For the measurement of dimensions, pictures of the six surfaces of the male terminal 10 held by the chuck mechanism 50 are taken with a camera K, each of the obtained images of the six surfaces is subjected to computer processing, and the dimension at a given point in the image is measured. Each of the six surfaces of the male terminal 10 is pointed at the camera K, and the chuck mechanism 50 is rotated around the first rotation axis A and the movable base 30 is rotated around the second rotation axis B by a given angle. Therefore, the first S motor 81 and the second S motor 43 are rotated based on a predetermined programming.

Prior to the measurement of dimensions, as shown in FIG. 1, when the chuck mechanism 50 is first mounted on the rotating body 75, whether or not the chuck mechanism 50 is set in a normal position with respect to the camera K is detected and any displacement is corrected.

Figure 14:
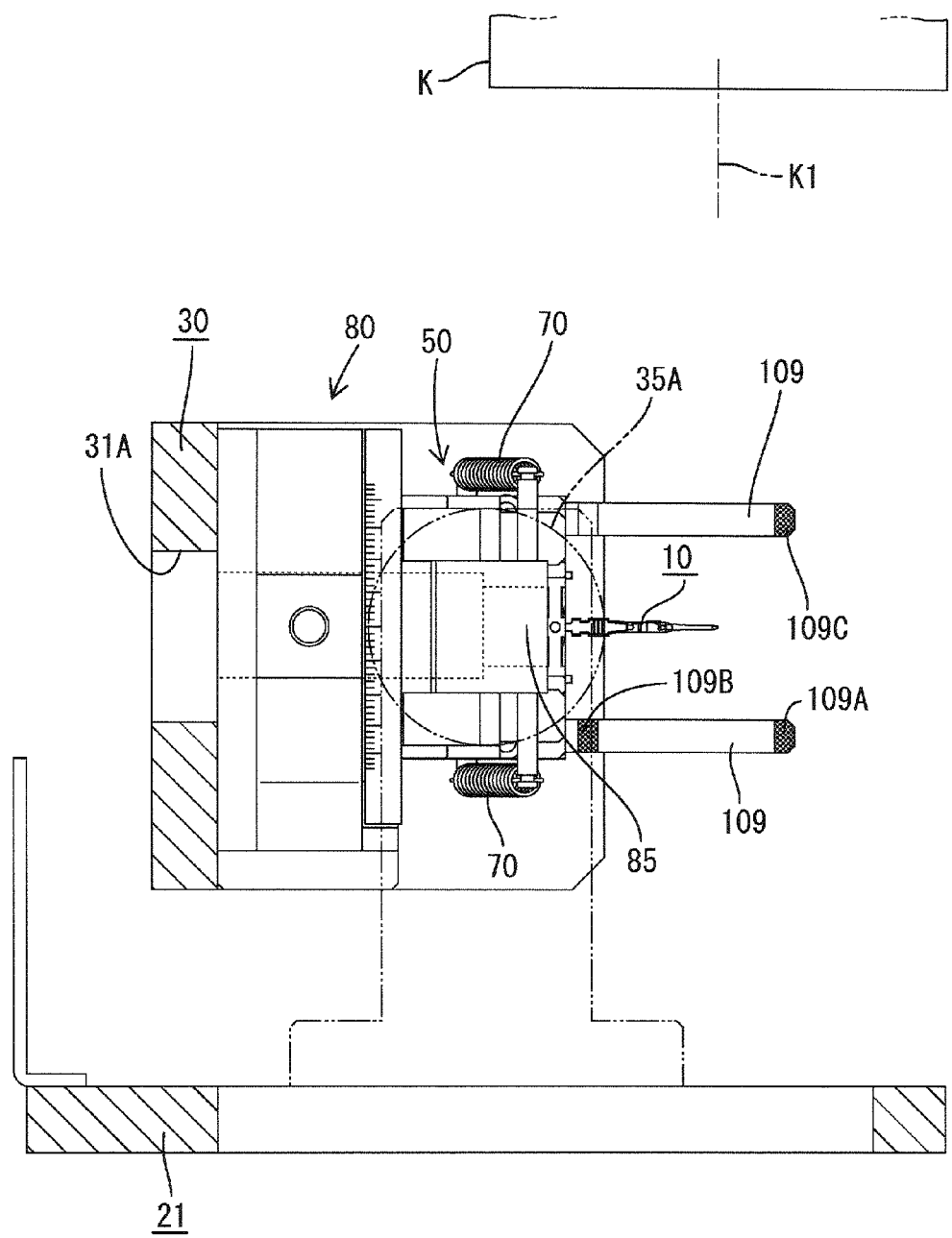
FIG. 14 is a view illustrating the case where pictures of four circumferential surfaces of the male terminal are taken.

To do so, the movable base 30 is rotated about the second rotation axis B by 90 degrees in the clockwise direction seen from the right of FIG. 1 (see FIG. 14) and the chuck mechanism 50 is rotated about the first rotation axis A by 90 degrees in the clockwise direction seen from the right of FIG. 14, such that both reference poles 109 are positioned pointing at the right side with their surfaces up. At the same time, the jig body 21 is moved on the table, such that both reference poles 109 are straightly opposed to each other under the camera K.

In the above state, pictures of the first focus surface 109A and the third focus surface 109C at the ends of both reference poles 109 are taken. If the distances from the camera K to each of the focus surfaces 109A, 109C are different, the heights of both reference poles 109 are different, that is, the chuck mechanism 50 is rotated in a displaced position around the first rotation axis A. As a result, a drive command is issued to the first S motor 81, and the chuck mechanism 50 is rotated by an angle corresponding to the difference in distance for a normal 0-degree correction.

Next, pictures of the first focus surface 109A and the second focus surface 109B at the distal end and the proximal end of one reference pole 109 are taken. If the distances from the camera K to each of the focus surfaces 109A, 109B are different, the reference pole 109 is inclined from the horizontal plane, that is, the chuck mechanism 50 is rotated in a displaced position around the second rotation axis B. As a result, a drive command is issued to the second S motor 43, and the movable base 30 is rotated by an angle corresponding to the difference in distance for a normal 0-degree correction.

By the above operations, the chuck mechanism 50 is set in a normal position with respect to the camera K.

One example of the procedure for measuring the dimensions of six surfaces will be described. After the above correction work is conducted, the chuck mechanism 50 is rotated 90 degrees about the first rotation axis A to return to the state shown in FIG. 14. At the same time, the jig body 21 moves on the table, and the male terminal 10 moves to a position at which its end is substantially in agreement with the optical axis K1 of the camera K. By the above operation, the right side surface of the male terminal 10 is opposed to the camera K, and the camera K moves up and down for focusing. Then, a picture of the right side surface of the male terminal 10 is taken by the camera K. Based on the obtained image, the dimensions of the right side surface are measured at any given point.

Subsequently, from the state shown in FIG. 14, the chuck mechanism 50 is rotated three times about the first rotation axis A by 90 degrees in the clockwise direction, seen from the front of the male terminal 10. As a result, the male terminal 10 is positioned such that three surfaces, that is, the top surface, the left side surface and the bottom surface, are sequentially opposed to the camera K. In the same way, based on the obtained images of three surfaces, the dimensions of the surfaces are measured.

Figure 15:
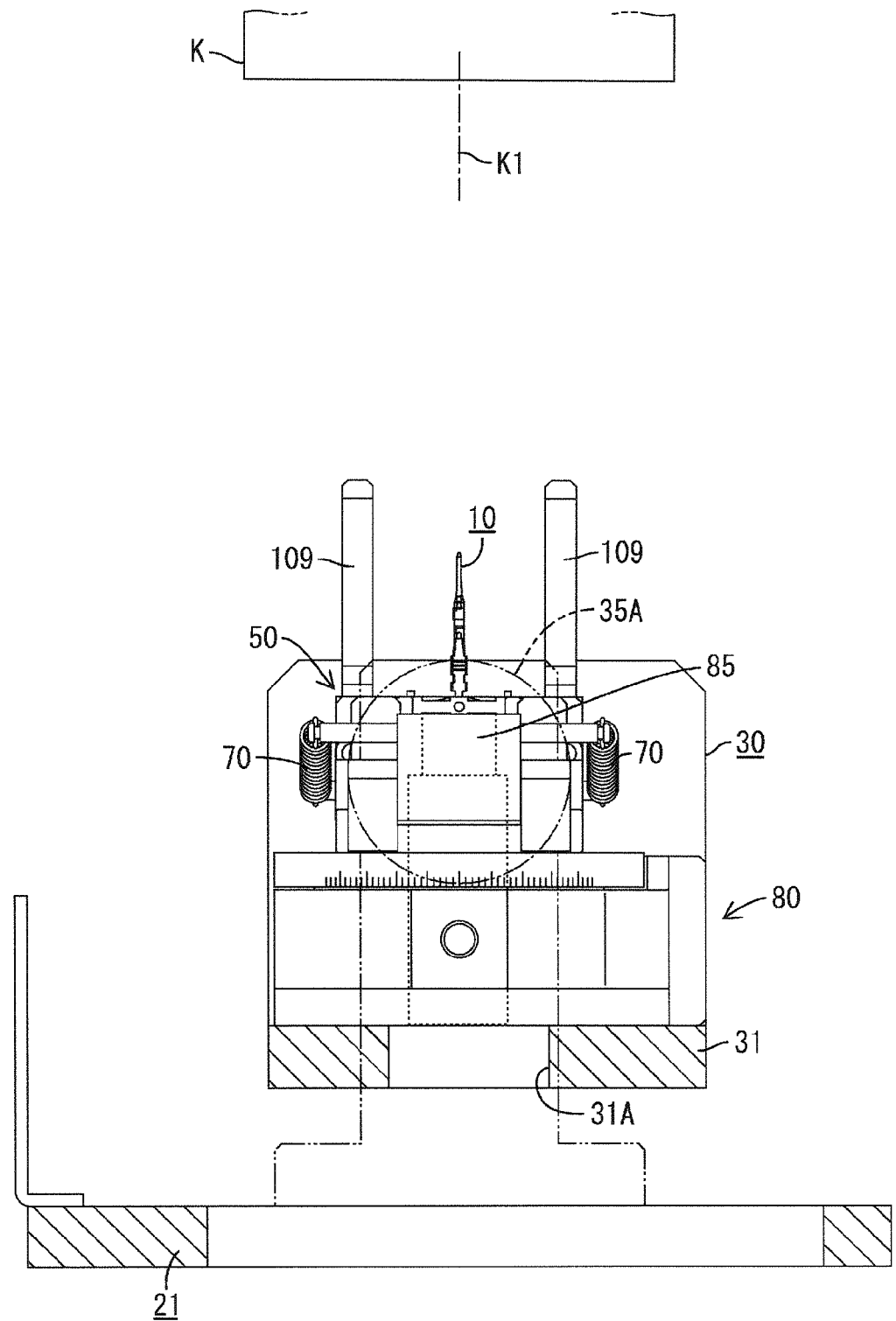
FIG. 15 is a view illustrating the case where a picture of the front surface of the male terminal is taken.

After the dimensions of four surfaces around the axis line of the male terminal 10 are measured, the chuck mechanism 50 is further rotated about the first rotation axis A by 90 degrees in the clockwise direction to return to the state shown in FIG. 14. Subsequently, the movable base 30 is rotated about the second rotation axis B by 90 degrees in the counterclockwise direction seen from the front of the same figure to return the jig body 21 to the original position. As a result, as shown in FIG. 15, the male terminal 10 stands upright with its front being opposed to the camera K. After the camera K moves up and down to obtain correct focus, a picture of the front surface of the male terminal 10 is taken and the dimensions of the front surface are measured.

Figure 16:
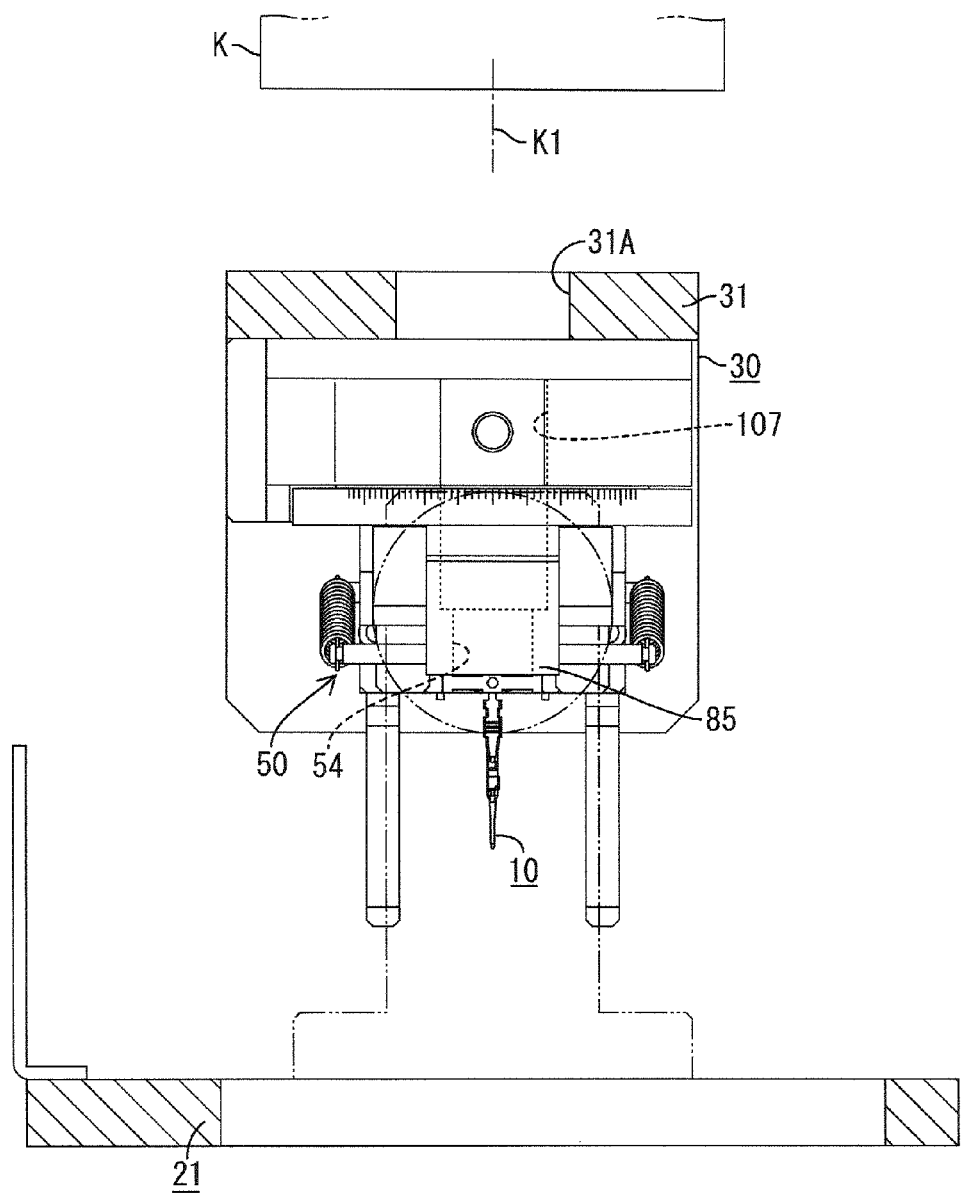
FIG. 16 is a view illustrating the case where a picture of the back surface of the male terminal is taken.

Lastly, when the movable base 30 is rotated about the second rotation axis B by 180 degrees from the state shown in FIG. 15, the male terminal 10 is inverted as shown in FIG. 16. The through-hole 54 of the chuck mechanism 50, the central hole 89A of the mounting plate 89, the central hole 75A of the rotating body 75 and the through-hole 76A of the bottom surface of the case 76 are all substantially concentrically aligned, and the back surface of the male terminal 10 is opposed to the camera K through the vertically penetrating through bore 107 and the opening 31A formed on the bottom plate 31 of the movable base 30. The camera K moves up and down again to obtain correct focus. After that, a picture of the back surface of the male terminal 10 is taken and the dimensions of the back surface are measured.

With the above procedures, the measurement of dimensions of six surfaces of the male terminal 10 that is a workpiece is completed. In the case where the male terminal 10 is laid in a sideways position, it is not necessary to move the jig body 21 as long as the male terminal 10 is within the shooting range of the camera K.

In order to detach the male terminal 10 after completion of measurement of dimensions, the releasing part 96A of the swing pressing body 96 in the state shown in FIG. 13 is pushed and swung in the clockwise direction, thereby releasing the pressing force to the right pressed portion 87B in the chuck mechanism 50. Then, as shown in FIG. 12, the left pressed portion 87A is pulled out of the pressing surface 91 to detach the chuck mechanism 50 from the mounting part 85 of the rotating body 75, the male terminal 10 is held by fingers and pulled, and the carrier 16 resiliently clamped between both clamping surfaces 56, 71 is pulled out.

As described above, in the jig 20 of this embodiment, the chuck mechanism 50 holding a male terminal 10 that is a workpiece is supported with respect to the movable base 30 such that the chunk mechanism 50 is rotatable around the first rotation axis A by the first rotation drive mechanism 80. The movable base 30 is supported to the jig body 21 such that it is rotatable around the second rotation axis B by the second rotation drive mechanism 40. In addition, the movable base 30 has an opening 31A in the bottom plate 31, within the area around the first rotation axis A of the bottom plate 31, through which the male terminal 10 held by the chuck mechanism 50 can be seen from the back of the bottom plate 31. Therefore, once the male terminal 10 that is a workpiece is held by the chuck mechanism 50, the rotation operation of the chuck mechanism 50 and the movable base 30 around the rotation axes A, B by the rotation drive mechanisms 80, 40 allows taking pictures of six surfaces of the male terminal 10 as well as taking pictures through the opening 31A provided in the movable base 30. That is, measurement of dimensions can be efficiently performed.

In order to hold the male terminal 10 to the chuck mechanism 50, the carrier 16 that was necessarily connected to the male terminal 10 in the process of manufacturing it is used as a mounted part. Therefore, it is not necessary to provide a mounted part separately. The carrier 16 is resiliently clamped between the pair of clamping surfaces 56, 71 by the spring elastic force, and the positioning hole 74 concentrically aligned with the pilot hole 17 of the carrier 16 is provided on the movable clamping body 63 side. Therefore, after the carrier 16 is resiliently clamped between the clamping surfaces 56, 71, while the jig 20 is passed through the positioning hole 74 into the pilot hole 17 to align both holes 74, 17 by moving the carrier 16 between both clamping surfaces 56, 71, the carrier 16, that is, the male terminal 10 can be resiliently held in a state of being positioned.

The present invention is not limited to the embodiment explained with the above descriptions and the drawings, but the embodiments as described below, for example, are included in the technical field of the present invention.

In the above embodiment, the carrier of the male terminal is manually pushed in order to clamp the male terminal that is a workpiece in the chuck mechanism. A jig specialized for the clamping work may be provided separately.

As for the clamping structure of the carrier, the clamping body in the movable side may be supported by a hinge such that the clamping body is rotatable so as to clamp the carrier with the clamping surface of the other part.

The sequence of taking pictures of six surfaces of a male terminal that is a workpiece, that is, the sequence of measurement of dimensions is not limited to the above embodiment, but is arbitrary.

A workpiece according to the present invention is not limited to a male terminal used as an example in the above embodiment, but it may be any electrical equipment for automobile, such as a female terminal and a housing, and other manufactured items. In brief, all kinds of workpieces that require measurement of dimensions of two or more surfaces may be targeted.

Depending on the shape of a workpiece or the condition of the surface requiring measurement of dimensions, a part of the workpiece may be clamped without separately providing a mounted part to be clamped by the chuck mechanism.

In the above embodiment, a jig with which pictures of six surfaces of a male terminal that is a workpiece can be taken was described as an example. Depending on the kind of a workpiece, a jig may be configured to take pictures of five surfaces except the back surface. In this case, it is not necessary to provide the first base with an opening through which a workpiece can be seen from the back. This kind of configuration is also included in the technical field of the present invention.

The invention claimed is:

1. A jig for measuring a workpiece, the jig being installed on a device for measuring dimensions of the workpiece based on images obtained by taking pictures of the workpiece with a camera, comprising:
   a chuck mechanism holding the workpiece;
   a first rotation drive mechanism that rotates the chuck mechanism around a predetermined first rotation axis;
   a first base having an area around the first rotation axis such that the workpiece held by the chuck mechanism is seen from the back of the first base through the opening, and holding the first rotation drive mechanism;
   a second rotation drive mechanism that rotates the first base around the second rotation axis orthogonal to the first rotation axis; and
   a second base holding the second rotation drive mechanism.

2. The jig for measuring a workpiece according to claim 1, wherein the chuck mechanism has a clamping part that positions and resiliently clamps a mounted part connected to the workpiece.

3. The jig for measuring a workpiece according to claim 1, wherein the first rotation mechanism includes a first motor, a rotating body that is rotatable around the first rotation axis by the first motor, and a mounting part provided on the rotating body in order to mount the chuck mechanism.

4. The jig for measuring a workpiece according to claim 2, wherein the chuck mechanism has a reference part whose picture is taken by the camera and which are used as a reference to determine whether or not the chuck mechanism is properly positioned with respect to the camera.

5. The jig for measuring a workpiece according to claim 1, wherein the second rotation mechanism has a shaft provided on the first base, a shaft bearing part provided on the second base and supporting the shaft, a second motor, and a connection mechanism that drives and connects an output shaft of the second motor and the shaft of the first base.

6. The jig for measuring a workpiece according to claim 1, wherein:
   the workpiece is a terminal fitting and is held by the chuck mechanism in a state of being connected to a carrier; and
   the chuck mechanism has a pair of clamping surfaces with which the carrier of the terminal fitting are held in a configuration of being openable and closable, and being biased in a closing direction by a spring elastic force.

7. The jig for measuring a workpiece according to claim 6, wherein one of the clamping surfaces has a positioning hole that is concentrically aligned with a pilot hole formed in the carrier connected to the terminal fitting.

8. The jig for measuring a workpiece according to claim 2, wherein the first rotation mechanism includes a first motor, a rotating body that is rotatable around the first rotation axis by the first motor, and a mounting part provided on the rotating body in order to mount the chuck mechanism.

9. The jig for measuring a workpiece according to claim 3, wherein the chuck mechanism has a reference part whose picture is taken by the camera and which are used as a reference to determine whether or not the chuck mechanism is properly positioned with respect to the camera.

10. The jig for measuring a workpiece according to claim 2, wherein:
   the first rotation mechanism includes a first motor, a rotating body that is rotatable around the first rotation axis by the first motor, and a mounting part provided on the rotating body in order to mount the chuck mechanism; and
   the chuck mechanism has a reference part whose picture is taken by the camera and which are used as a reference to determine whether or not the chuck mechanism is properly positioned with respect to the camera.

11. The jig for measuring a workpiece according to claim 2, wherein the second rotation mechanism has a shaft provided on the first base, a shaft bearing part provided on the second base and supporting the shaft, a second motor, and a connection mechanism that drives and connects an output shaft of the second motor and the shaft of the first base.

12. The jig for measuring a workpiece according to claim 3, wherein the second rotation mechanism has a shaft provided on the first base, a shaft bearing part provided on the second base and supporting the shaft, a second motor, and a connection mechanism that drives and connects an output shaft of the second motor and the shaft of the first base.

13. The jig for measuring a workpiece according to claim 4, wherein the second rotation mechanism has a shaft provided on the first base, a shaft bearing part provided on the second base and supporting the shaft, a second motor, and a connection mechanism that drives and connects an output shaft of the second motor and the shaft of the first base.

14. The jig for measuring a workpiece according to claim 8, wherein the second rotation mechanism has a shaft provided on the first base, a shaft bearing part provided on the second base and supporting the shaft, a second motor, and a connection mechanism that drives and connects an output shaft of the second motor and the shaft of the first base.

15. The jig for measuring a workpiece according to claim 9, wherein the second rotation mechanism has a shaft provided on the first base, a shaft bearing part provided on the second base and supporting the shaft, a second motor, and a connection mechanism that drives and connects an output shaft of the second motor and the shaft of the first base.

16. The jig for measuring a workpiece according to claim 10, wherein the second rotation mechanism has a shaft provided on the first base, a shaft bearing part provided on the second base and supporting the shaft, a second motor, and a connection mechanism that drives and connects an output shaft of the second motor and the shaft of the first base.

* * * * *